United States Patent Office 3,555,119
Patented Jan. 12, 1971

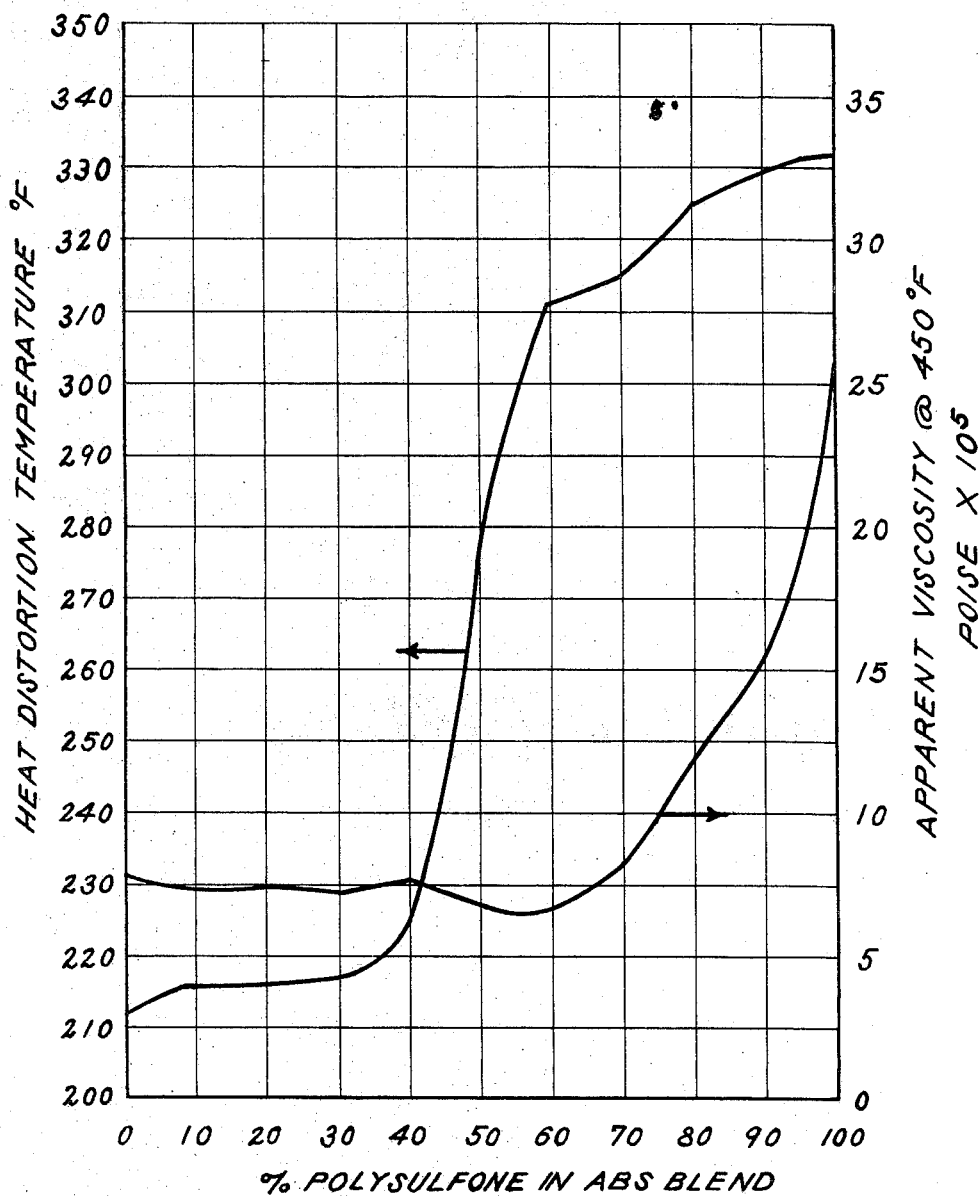

3,555,119
THERMOPLASTIC RESIN BLEND OF A POLYSULFONE WITH ABS
Alfred F. Ingulli, Woodbury, and Henry L. Alter, West Haven, Conn., assignors to Uniroyal, Inc., New York, N.Y., a corporation of New Jersey
Continuation of application Ser. No. 671,654, Sept. 29, 1967. This application Sept. 30, 1969, Ser. No. 866,068
Int. Cl. C08f 41/12
U.S. Cl. 260—876                    19 Claims

ABSTRACT OF THE DISCLOSURE

Blends of thermoplastic polysulfone resin with ABS plastic are characterized by an unusually useful combination of properties, particularly high heat distortion temperature in combination with good flow characteristics, as well as impact resistance, flexural strength and self-extinguishing characteristics.

This application is a streamline continuation of Ser. No. 671,654, filed Sept. 29, 1967, now abandoned.

BACKGROUND OF THE INVENTION

(1) Field of the invention

This invention relates to synthetic thermoplastic resin compositions. More particularly, the invention relates to the resin which results from the physical blending of a polysulfone thermoplastic resin with an ABS polymer.

(2) Description of the prior art

ABS resins of the kind employed in the invention are disclosed in U.S. Pats. 2,439,202, L. E. Daly, Apr. 6, 1948; 2,600,024, H. Romeyn, Jr. et al., June 10, 1964; 2,820,773, C. W. Childers, Jan. 21, 1958; 3,111,501, M. S. Thompson, Nov. 18, 1963; 3,198,853, R. L. Bergen, Jr., Aug. 3, 1965; and 3,261,887, J. U. Mann, July 19, 1966, for example.

Thermoplastic polysulfone resin of the kind employed in the invention is disclosed in U.S. Pat. 3,264,536, H. B. Robinson et al., Aug. 2, 1966.

Blends of ABS with various other polymers are known, but not with thermoplastic polysulfone resins. For example, blends of ABS with polycarbonate resins are disclosed in U.S. Pat. 3,130,177, T. S. Grabowski, Apr. 21, 1964.

Blends of thermosetting polysulfone resins with thermosetting phenolic resins (U.S. Pats. 3,245,947, N. D. Hanson et al., Apr. 12, 1966 and 3,256,361, J. Harding et al., June 14, 1966) are known, but such blends are quite unlike the blends of the present invention.

SUMMARY OF THE INVENTION

There is a need for reasonably priced plastic compounds with resistance to high temperatures which at the same time possess good flow characteristics and impact strength. The present invention provides such a compound, in the form of a blend of from 10 to 90 parts (all quantities are expressed by weight herein) of a thermoplastic polysulfone plastic and correspondingly from 90 to 10 parts of ABS plastic. The resulting blends exhibit unexpected thermoplastic properties including improved flow, heat distortion temperature, impact resistance and flexural strength.

DESCRIPTION OF THE DRAWING

In the accompanying drawing, the sole figure is a graph showing variations in heat distortion temperature and apparent viscosity, with the percentage of polysulfone resin in the blend.

DESCRIPTION OF PREFERRED EMBODIMENTS

The expression "ABS plastic" is used herein in its conventional sense as referring to a thermoplastic polymer composition containing combined acrylonitrile, butadiene, and styrene. As is well known to those skilled in the art, the ABS plastic may be of the graft copolymer type, of the physical blend type (polyblend), or a combination of the two. The conventional ABS graft copolymers are made by graft copolymerizing resin-forming monomers, namely, styrene and acrylonitrile, on a previously prepared polybutadiene rubber spine, or a butadiene-styrene copolymer rubber spine; in the final graft copolymer the resinous portion and the rubbery portion are believed to be in large part chemically combined. The graft copolymer may be made by an emulsion polymerization technique, in which a previously prepared latex of polybutadiene or similar rubber, which serves as a spine, is subjected to emulsion polymerization conditions with a monomeric mixture of styrene and acrylonitrile emulsified therein. Alternatively, graft copolymer may be prepared by solution polymerization methods, or by the so-called mass-bead technique. On the other hand, the physical blend type of ABS is typically a mixture of butadiene-acrylonitrile rubber with separately prepared styrene-acrylonitrile resin. In some cases, the graft polymer type of ABS is blended with additional separately prepared styrene-acrylonitrile resin and/or butadiene-acrylonitrile rubber. Any such type of ABS resin is suitable for blending with the thermoplastic polysulfone resin in accordance with the invention. Moreover, if desired, other monomers such as alphamethylstyrene, methacrylonitrile, ethyl acrylate, methyl methacrylate, and the like, may be substituted for some or all of the styrene or acrylonitrile. In some cases, the ABS polymer may be admixed with other resins, such as vinyl resins, especially polyvinyl chloride.

Since the ABS material has both a rubbery component (e.g., polybutadiene or butadiene-styrene spine or butadiene-acrylonitrile copolymer component) and a resinous component (styrene-acrylonitrile), it may therefore be regarded as a "gum plastic" type of material. Usually the proportion of the rubbery component in the ABS is from 5 to 35%, while the proportion of resin is correspondingly from 95 to 65%. The overall proportion of acrylonitrile, butadiene and styrene usually falls within the ranges: 10 to 40% acrylonitrile; 5 to 65% butadiene; and 25 to 85% styrene.

The M. S. Thompson Pat. 3,111,501, referred to above as disclosing ABS resins of the kind employed in the invention, is directed to the type of ABS made by blending alpha-methylstyrene-acrylonitrile resin with a graft copolymer of styrene and acrylonitrile on polybutadiene. Thus, for example, there may be employed in this invention the compositions made by blending alpha-methylstyrene/acrylonitrile resin (69/31) (Thompson, col. 2, lines 34–35) with a graft copolymer of styrene/acrylonitrile (70/30 ratio) monomers on polybutadiene latex (46% styrene/acrylonitrile and 54% rubber solids) (Thompson, col. 3, lines 32–37). Thompson also discloses, at col. 1, lines 68–70, that some or all of the styrene in the graft copolymer may be replaced by alpha-methylstyrene. Likewise, Mann 3,261,887, col. 5, lines 48, 49; col. 10, Tables 6 and 7; and col. 11, lines 50, 51, 54, 55 discloses alpha-methylstyrene as the comonomer with butadiene to make alpha- methylstyrene-butadiene copolymer spine for grafting, while Grabowski 3,130,177, col. 4, lines 13–15, discloses replacement of the styrene, in part or entirely, by alpha-methylstyrene, in the preparation of the graft copolymer. Similarly, the R. L. Bergen, Jr. Pat. 3,198,853 referred to previously shows ABS containing graft copolymer of styrene and acrylonitrile on polybutadiene blended with separately prepared resinous copolymer of alpha-methylstyrene and acrylonitrile. Thus, at column 2, lines 39–42, Bergen, Jr. discloses blending the graft copolymer with a separately prepared resinous copolymer of styrene or alpha-methylstyrene and acrylonitrile. At column 4, lines 6–12, Bergen, Jr. discloses a blend of 35 parts of a graft copolymer of 50 parts of styrene and acrylonitrile (ratio 70/30) on 50 parts of polybutadiene rubber, blended with 65 parts of separately prepared resinous copolymer of alpha-methylstyrene and acrylonitrile (ratio 69/31).

The polysulfone resin component of the blend of the invention may be described as a polyarylene polyether polysulfone, which is a linear thermoplastic reaction product of an alkali metal double salt of a dihydric phenol and a dihalobenzenoid compound, either or both of which contain a sulfone linkage —$SO_2$— between arylene groupings, to provide sulfone units in the polymer chain in addition to arylene units and ether units. The polysulfone polymer has a basic structure composed of recurring units of the formula

—O—E—O—E'— wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms; at least one of said residua (E or E' or both) provides a sulfone linkage between aromatic carbon atoms. Such polysulfones are included within the class of polyarylene polyether resins described in U.S. Pat. 3,264,536, Robinson et al., Aug. 2, 1966, the disclosure of which is hereby incorporated herein by reference for the purpose of describing and exemplifying E and E' in more detail, including the preferred forms of E derived from dinuclear phenols having the structure:

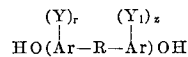

as defined therein, with the further limitation that either E or E' must be so selected, from the values of E and E' disclosed in said patent, as to contain a sulfone linkage to provide sulfone units in the final polymer chain. Thus, if E is so selected as not to contain the sulfone linkage, then E' must be selected from one of the forms containing sulfone linkage; if E' is so selected as not to contain a sulfone linkage, then E must be selected from one of the forms containing a sulfone linkage. Of course, E and E' may both contain sulfone linkages if desired. Typical preferred polymers are composed of recurring units having the formula

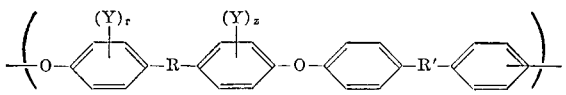

as described in the Robinson et al. patent (particularly column 4, line 69 to column 5, line 3), wherein it is disclosed that R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive), with the further proviso that at least one of R and R' must be —$SO_2$—. Even more preferred are the thermoplastic polyarylene polysulfones of the above formula wherein r and z are zero, R is a divalent connecting radical

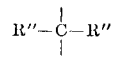

wherein R'' represents, as exemplified in Robinson et al., a member of the group consisting of alkyl, lower aryl, and the halogen substituted groups thereof, and R' is a sulfone group.

Typical examples are the reaction products prepared from 2,2-bis-(4-hydroxyphenyl) propane (source of E' residue) with 4,4'-dichlorodiphenylsulfone (source of E' residue) and equivalent reaction products such as those from 4,4'-dichlorodiphenylsulfone with the bisphenol of benzophenone, or the bisphenol of acetophenone, or the biphenol of vinyl cyclohexene, or 4,4'-dihydroxydiphenyl sulfone (see Examples 1, 3, 4, 5 and 7 of Robinson et al.).

To prepare the blend of the invention, the two starting polymers, namely, ABS material and thermoplastic polysulfone resin, are mixed together in the desired proportions with the aid of any suitable mixing device conventionally used for mixing rubbers or plastics, such as a differential roll mill or an internal mixer. In order to facilitate thorough mixing of the polymers and to develop the desired improved combination of physical properties, the mixing is carried out at elevated temperatures, sufficient to soften the polymers so that they are thoroughly dispersed and intermingled with each other. The mixing temperature will in general vary with the particular ABS and the particular polysulfone employed; usually the polysulfone, which is the higher-softening material, will govern the mixing temperature selected. The mixing is continued until a uniform blend is obtained.

The resin composition of the invention which results from the blending of thermoplastic polysulfone with ABS plastic possesses a synergistic effect in the area of flow, that is, the results of rheological studies on the materials of the invention surprisingly reveal the ability of blends of the invention to actually flow better (easier) than either the pure ABS or the pure polysulfone used in the blends. This is of immense practical importance. The main advantages of improved flow include lower processing temperatures, shorter cycles, ability to mold complicated parts, lower molded in stress, better part surface finish and simpler mold design. All of these advantages are related to flow, and depending on circumstances, any one of them could be the main advantage.

A particularly unexpected feature of the invention resides in the fact that the improved flow characteristics are obtained in combination with the remarkably high heat distortion temperature. In the range of 40%–60% polysulfone (blended with correspondingly 60% to 40% ABS), the behavior of the heat distortion temperature is particularly remarkable. Thus, the heat distortion temperature of the blend increases slowly as the percent polysulfone increases, until the 40% level is reached. Above 40% polysulfone, the heat distortion temperature rises rapidly as the percent polysulfone increases. This is, surprisingly, an area of excellent flow properties in the mixture. At 40% of a particular commercially available polysulfone, the blend heat distortion temperature is 107° F. below that of pure polysulfone. At 60% polysulfone, the difference is only 21° F. In other words, a 20% increase in the concentration of this polysulfone based on the total blend weight caused the heat distortion temperature of the blend to increase 71.6% of the heat distortion temperature differential between the pure polysulfone and the pure ABS.

In addition to the unexpected combination of flow characteristics and heat distortion temperature, the present blends of polysulfone and ABS possess other valuable properties. These properties include excellent impact strength and high flexural strength. The blends maintain most of the desirable characteristics of polysulfone and in addition embody a dramatic improvement in impact strength, primarily contributed by the ABS portion of the blend. The blends are less expensive than the pure polysulfone, and therefore represent an economical way of achieving a desirable combination of properties. The blends are self-extinguishing when the polysulfone portion of the blend is present in 50% or greater concentration.

In addition to the essential polysulfone resin and ABS material, the blends of the invention may, if desired, contain other modifying ingredients, including pigments or fillers, stabilizing agents, processing aids, lubricants, mold release agents, or other conventional modifying ingredients. The blends may be compounded with blowing agents, to make expanded materials.

The blends based on graft copolymer type of ABS are preferred, particularly from the standpoint of impact strength, although the blends based on polyblend (physical mixture) type of ABS have reasonable impact strength when compared with a plastic like PVC.

The following examples will serve to illustrate the practice of the invention in more detail.

EXAMPLE I

In this example, the ABS employed contains 22.2% acrylonitrile, 26.5% butadiene and 51.3% styrene, and is made by blending 53 parts of graft copolymer with 47 parts of separately prepared styrene-acrylonitrile resin. The graft copolymer is a graft copolymer of 34 parts styrene and 16 parts acrylonitrile on 50 parts of polybutadiene. The styrene-acrylonitrile resin contains 71% styrene, 29% acrylonitrile.

The thermoplastic polysulfone employed is a commercially available polysulfone composed of recurring units having the structural formula

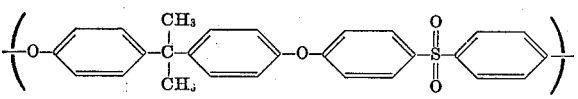

suitably prepared, for example, as described in Example 1 of the Robinson et al. patent referred to above.

Blends of the ABS and polysulfone, in various proportions as shown in Table 1 below, are prepared by mixing the two materials together in a Banbury mixer at 460° F. for two minutes. The blends are then sheeted off on a 375° F. mill and diced.

To determine the flow properties of the blends, the apparent viscosity is measured on a commercially available rheometer, such as the Instron Capillary rheometer, Model TTC, MCR. For this purpose, rods 5 inches by 3/8 inch are prepared by injection molding from the material to be tested. Each rod is heated to 450° F. in the barrel of the rheometer. A piston plunger is then pressed down on top of the heated rod, forcing the rod to flow through a 0.060 inch diameter capillary, having a length to diameter ratio of 33. The piston plunger descends at a constant speed of 0.01 inch per minute, and the force required to extrude the rod through the capillary is measured. The piston plunger speed employed is such as to produce apparent shear rates which correspond roughly with those of a Mooney viscometer machine run at 2 r.p.m.

The results, as shown in Table I, show that the blends of ABS and polysulfone are capable of flowing better than either the pure ABS or the pure polysulfone used in the blends.

Table I also shows that the blends of the invention have high impact strength, and good flexural strength.

The self-extinguishing property shown in Table I is measured by ASTM D635–63.

The graph in the accompanying drawing shows plots of viscosity and heat distortion temperature [measured by ASTM method D648–56 (1961)] as functions of increasing polysulfone content of the blend.

EXAMPLE II

Table II lists the physical properties of an ABS-polysulfone blend prepared with a polyblend (physical mixture) type ABS. The ABS was made by blending 67% of styrene-acrylonitrile resin with 33% of butadiene-acrylonitrile rubber. The breakdown of monomers in the ABS is as follows:

| | Percent |
|---|---|
| Styrene | 49 |
| Butadiene | 19 |
| Acrylonitrile | 32 |

The polysulfone used in this example and the method of preparation of the blend was the same as in Example I. Flow properties were determined in the same way as in Example I.

TABLE II.—PHYSICAL PROPERTIES OF POLYSUFONE-ABS BLENDS

| | | | | | | | | | |
|---|---|---|---|---|---|---|---|---|---|
| Percent polysulfone | 0 | 10 | 30 | 40 | 50 | 60 | 70 | 90 | 100 |
| Percent ABS, San-nitrile rubber type | 100 | 90 | 70 | 60 | 50 | 40 | 30 | 10 | 0 |
| Heat distortion temperature, ° F. 264 p.s.i. | 199 | 200 | 204 | 210 | 223 | 273 | 311 | 330 | 332 |
| Flexural strength, p.s.i. | 6,140 | 6,912 | 8,356 | 9,216 | 10,176 | 11,904 | 12,288 | 15,000 | 15,200 |
| Apparent viscosity, 450° F., poise X10⁵ | 9.75 | 9.30 | 8.84 | 8.85 | 8.89 | 8.85 | 10.5 | 16.1 | 25.6 |

By examining the data in Table II it can be seen that the apparent viscosity of the blends remains relatively constant at a level roughly equal to or below the pure ABS until the 90% polysulfone level is reached and well below that of pure polysulfone even at the 90% level. It can also be seen that the heat distortion temperature of the blends increases with increasing percent polysulfone although not as dramatically as in Example I. Flexural strength also increases with increasing polysulfone.

From the foregoing it will be apparent that the present blends of polysulfones and ABS are suitable for use in many applications requiring a high temperature resistant, self-extinguishing, impact resistant plastic. Appliance housings, and automobile applications are numerous. The material is adaptable to conventional fabrication methods, especially injection molding, although other methods such as extrusion and blow molding may be used. The blends of the invention may be used in making truck cabs, camper bodies or trailers, and the like, if desired in the form of a laminate including an expanded layer of the material of the invention. In parts fabricated from the blend of the invention, the impact strength is less dependent on part thickness than in certain prior materials.

Having thus described our invention, what we claim and desire to protect by Letters Patent is:

1. A synthetic thermoplastic resin composition comprising a blend of
   (A) from 10 to 90 parts by weight of a linear thermoplastic polyarylene polyether polysulfone resin composed of recurring units having the formula

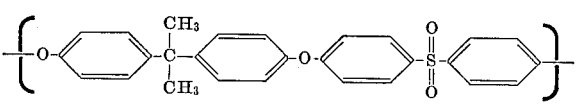

TABLE I.—PHYSICAL PROPERTIES OF POLYSULFONE-ABS BLENDS

| | | | | | | | | | | |
|---|---|---|---|---|---|---|---|---|---|---|
| Percent polysulfone | 0 | 10 | 20 | 30 | 40 | 50 | 60 | 70 | 80 | 90 | 100 |
| Percent ABS, San Graft type | 100 | 90 | 80 | 70 | 60 | 50 | 40 | 30 | 20 | 10 | 0 |
| 1/4" notched izod, ft. lb./in. notch | 7 | 6.2 | 6.0 | 5.7 | 5.5 | 4.2 | 3.9 | 3.1 | 2.7 | 2.2 | 1.1 |
| Heat distortion temperature, ° F., 264 p.s.i. | 212 | 216 | 212 | 217 | 225 | 276 | 311 | 315 | 325 | 316 | 332 |
| Flexural strength, p.s.i. | 7,650 | 8,150 | 9,016 | 9,700 | 10,150 | 11,350 | 12,750 | 12,670 | 13,440 | | 15,200 |
| Apparent viscosity 450° F., poise, X10⁵ | 7.6 | 7.3 | 7.4 | 7.2 | 7.6 | 6.7 | 6.9 | 8.2 | 17.0 | 15.2 | 25.6 |
| Self extinguishing | No | No | No | No | No | Yes | Yes | Yes | Yes | Yes | Yes | and (B) correspondingly from 90 to 10 parts by weight of acrylonitrile-butadiene-styrene polymer, per 100 parts by weight of (A) plus (B).

2. A composition as in claim 1 in which (B) comprises a graft copolymer of styrene and acrylonitrile on a rubber spine selected from polybutadiene and butadiene-styrene copolymer.

3. A composition as in claim 2 in which (B) further contains separately prepared styrene-acrylonitrile resin.

4. A composition as in claim 1 in which (B) is a mixture of butadiene-acrylonitrile copolymer rubber and styrene-acrylonitrile resin.

5. A composition as in claim 1 in which (A) amounts to at least 50 parts and (B) amounts to correspondingly 50 parts or less.

6. A composition as in claim 1 in which (A) amounts to 40–60 parts and (B) amounts to correspondingly 60–40 parts.

7. A composition as in claim 1 in which part or all of said styrene in (B) is alpha-methylstyrene.

8. A composition as in claim 1 in which (B) comprises a graft copolymer of alpha-methylstyrene and acrylonitrile on a rubber spine selected from polybutadiene, butadiene-styrene copolymer and butadiene-alpha-methylstyrene copolymer.

9. A composition as in claim 2 in which (B) further contains separately-prepared alpha-methylstyrene-acrylonitrile resin.

10. A synthetic thermoplastic resin composition comprising a blend of
(A) from 10 to 90 parts by weight of a linear thermoplastic polyarylene polyether polysulfone resin and
(B) correspondingly from 90 to 10 parts by weight of acrylonitrile-butadiene-styrene polymeric material per 100 parts by weight of (A) plus (B).

11. A composition as in claim 10 wherein (A) is composed of recurring units having the formula $$-O-E-O-E'-$$

wherein E is the residuum of a dihydric phenol and E' is the residuum of a benzenoid compound having an inert electron withdrawing group in at least one of the positions ortho and para to the valance bonds, where both of said residua are valently bonded to the ether oxygens through aromatic carbon atoms, and at least one of E and E' provides a sulfone linkage between aromatic carbon atoms.

12. A composition as in claim 10 wherein (A) is composed of recurring units having the formula

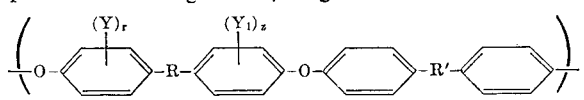

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups, Y and $Y_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive, with the further proviso that at least one of R and R' must be $-SO_2-$.

13. A composition as in claim 10 in which (B) comprises a graft copolymer of styrene or alpha-methylstyrene and acrylonitrile on a rubbery spine selected from polybutadiene, butadiene-styrene copolymer and butadiene-alpha-methylstyrene copolymer.

14. A composition as in claim 13 in which (B) further contains styrene-acrylonitrile resin.

15. A composition as in claim 13 in which (B) contains alpha-methylstyrene-acrylonitrile resin.

16. A composition as in claim 13 in which (A) amounts to at least 50 parts and (B) amounts to correspondingly 50 parts or less.

17. A composition as in claim 13 in which (A) amounts to 40–60 parts and (B) amounts to correspondingly 60–40 parts.

18. A composition as in claim 10 in which part or all of said styrene in (B) is alpha-methylstyrene.

19. A composition as in claim 12 in which part or all of said styrene in (B) is alpha-methylstyrene.

References Cited

UNITED STATES PATENTS 3,264,536   8/1966   Robinson et al. _____ 317—258

FOREIGN PATENTS 1,016,245   1/1966   Great Britain _____ 260—49

MURRAY TILLMAN, Primary Examiner

C. J. SECCURO, Assistant Examiner

U.S. Cl. X.R.

260—49, 887